US012608626B2

(12) United States Patent
Filoti et al.

(10) Patent No.: US 12,608,626 B2
(45) Date of Patent: Apr. 21, 2026

(54) PLUG-AND-ANALYZE FRAMEWORK FOR KNOWLEDGE BASE CONSTRUCTION

(71) Applicant: Bristol-Myers Squibb Company, Princeton, NJ (US)

(72) Inventors: Octavian Florin Filoti, Portsmouth, NH (US); Christian Joseph Merrill, Bordentown, NJ (US); Mark Salacinski, Warren, NJ (US); Irene Yue-Ling Pak, New Brunswick, NJ (US)

(73) Assignee: Bristol-Myers Squibb Company, Princeton, NJ (US)

( * ) Notice: Subject to any disclaimer, the term of this patent is extended or adjusted under 35 U.S.C. 154(b) by 1037 days.

(21) Appl. No.: 17/725,290

(22) Filed: Apr. 20, 2022

(65) Prior Publication Data

US 2023/0342630 A1     Oct. 26, 2023

(51) Int. Cl.
*G06F 17/00* (2019.01)
*G06N 5/022* (2023.01)

(52) U.S. Cl.
CPC .................................... *G06N 5/022* (2013.01)

(58) Field of Classification Search
CPC ..... G06N 5/022; G06N 20/00; G06F 11/1476
See application file for complete search history.

(56) References Cited

U.S. PATENT DOCUMENTS

| | | | |
|---|---|---|---|
| 11,677,770 B2 * | 6/2023 | Baldini Das Neves | ..................... G06N 5/022 726/23 |
| 2020/0257990 A1 | 8/2020 | Filoti et al. | |

OTHER PUBLICATIONS

Saeed Ghanbari, Gokul Soundararajan, and Cristiana Amza. 2010. A query language and runtime tool for evaluating behavior of multi-tier servers. SIGMETRICS Perform. Eval. Rev. 38, 1, 131-142. <https://doi.org/10.1145/1811099.1811055>, June (Year: 2010).*
Zhang et al. "DeepDive: Declarative Knowledge Base Construction" vol. 60 No. 5, May 2017, DOI: 10.1145/3060586, retreived from https://dl.acm.org/doi/pdf/10.1145/3060586.
Wright, D. (2019). NormCo: Deep Disease Normalization for Biomedical Knowledge Base Construction. UC San Diego. ProQuest ID: Wright_ucsd_0033M_18300. Merritt ID: ark:/13030/m5770fh2. Retrieved from https://escholarship.org/uc/item/3410q7zk.
Feng Niu et al. "Elementary: Large-Scale Knowledge-Base Construction via Machine Learning and Statistical Inference" retrieved from International Journal on Semantic Web and Information Systems (IJSWIS) https://www.igi-global.com/article/content/74339. DOI: 10.4018/jswis.2012070103. Jul. 2012.

(Continued)

*Primary Examiner* — Greta L Robinson
(74) *Attorney, Agent, or Firm* — Honigman LLP; Grant Griffith; Jonathan O'Brien

(57) ABSTRACT

Provided herein are system, apparatus, device, method, and/or computer program product embodiments, and/or combinations and sub-combinations thereof, for generating a knowledge base. In a given embodiment, machine-learning techniques and models are used to extract information and knowledge from different document formats by processing any supported unstructured, semi-structured and structured data types. The extracted information and knowledge may be used to generate a knowledge base.

45 Claims, 10 Drawing Sheets

(56)     References Cited

OTHER PUBLICATIONS

Gupta et al. "MACE2K: A Text-Mining Tool to Extract Literature-based Evidence for Variant Interpretation using Machine Learning" retrieved from https://www.biorxiv.org/content/10.1101/2020.12.03.409094v1. doi: https://doi.org/10.1101/2020.12.03.409094. Posted Dec. 4, 2020.

Sen Wu et al. "Fonduer: Knowledge Base Construction from Richly Formatted Data" retreived from https://doi.org/10.48550/arXiv.1703.05028. Dated Mar. 15, 2017.

* cited by examiner

DONE (success)

FAIL (e.g., timing, window, bugs)

DONE (with exceptions)

UPGRADED (new model version)

PLUGGED (new model added)

UNPLUGGED (model removed)

REUSE (use previous model output)

Record Keeper
START | IN_PROGRESS | DONE

102

| START | IN PROGRESS | DONE |
|---|---|---|
| [[ML1, ML2], [ML9]] | | |
| [[ML4], [ML5]] | | |
| [[ML6, ML7], [ML3]] | | |
| [...] | | |

400

| ML1 | ML2 | ML3 | ML4 |
|---|---|---|---|
| ML5 | ML6 | ML7 | ML9 |
| ... | ... | ML8 | ML13 |
| ... | ... | ... | ... |

402

| ML1 | ML2 | ML3 | ML4 |
|---|---|---|---|
| ML5 | ML6 | ML7 | ML9 |
| ... | ... | ... | ML13 |
| ... | ... | ... | ... |

404

Record Keeper (RK)

Can be configured for one Model only (RESTART)

800

802

Receive files

804

Trigger execution of the first set of machine-learning models

806

Trigger execution of the second set of machine-learning models

808

Tracks the completion status of second set of machine-learning models

810

Generate knowledge base

900

902 Receive query

904 Identify existing knowledge

906 Trigger execution of special machine-learning model

902 Update knowledge base

PLUG-AND-ANALYZE FRAMEWORK FOR KNOWLEDGE BASE CONSTRUCTION

BACKGROUND

Knowledge base construction is the process of populating a knowledge base with information extracted from documents. Knowledge bases are an essential part of enterprises that use large volumes of data, and are often used in fields such as information technology, biotech, fintech, etc. Knowledge bases may be represented as search engines, relational databases, graph engines, or any type of software that can be used to fetch the information stored within the knowledge base. Knowledge base construction has received tremendous interest from both academia and industry; however, knowledge base construction poses numerous challenges, including flexibility, scalability, and adaptability.

SUMMARY

Provided herein are system, apparatus, device, method, and/or computer program product embodiments, and/or combinations and sub-combinations thereof, for generating a knowledge base.

A given embodiment includes a method for generating a knowledge base. The method includes receiving a plurality of files and triggering execution of a first set of machine-learning models to extract data from the plurality of files. Each of the first set of machine-learning models outputs a first set of data objects comprising extracted data from the plurality of files. The method further includes triggering execution of a second set of machine-learning models using the first set of data objects. The second set of machine-learning models are configured to output a second set of data objects. Each data object in the second set of data objects comprises an attribute of a plurality of attributes about the extracted data in the first set of data objects. The method further includes tracking a completion status of each of the second set of machine-learning models. Upon completion of each of the second set of machine-learning models, the method further includes generating the knowledge base using the first set of data objects and the second set of data objects.

In some embodiments, the first set of data objects are stored in a data storage device and the method further comprising indicating, by the processor, to the second set of machine-learning models, a location of the first set of data objects in the data storage device.

In some embodiments, each of the second set of machine-learning models are configured to identify at least one attribute of the plurality of attributes about the extracted data using a machine-learning algorithm.

In some embodiments, the completion status is one of "start," "in progress," or "done." The method further comprises triggering the execution of the first or second set of machine-learning models by updating the completion status of the first or second set of machine-learning models to "start." Moreover, the method further includes receiving an indication of that execution of a machine-learning model of the first set of machine-learning models or second set of machine-learning models has been initiated, and updating the completion status of the machine-learning model to "in-progress." Upon completion of a machine-learning model of the first set of machine-learning models or second set of machine-learning models, the method further includes updating the completion status of the machine-learning model to "done."

In some embodiments, the method further includes instructing the second set of machine-learning models to execute a subset of machine-learning models of the second set of machine-learning models in parallel.

In some embodiments, execution of a first subset of machine-learning models of the second set of machine-learning models depends on output of a second subset of machine-learning models of the second set of machine-learning models, and the method further includes instructing the second set of machine-learning models to execute the first and second subset of machine-learning models in a predetermined order.

In some embodiments, the plurality of files comprises structured or unstructured data.

In some embodiments, the attributes of the extracted data comprises one or more of: named entity recognition (NER) labels, annotations, or relationships.

In some embodiments, the method further includes identifying an exception during the execution of a machine-learning model from the second set of machine-learning models, and iteratively triggering re-execution of the second set of machine-learning models until each of the second set of machine-learning models is executed free of any exceptions.

In some embodiments, the method further includes triggering execution of the second set of machine-learning models to process new extracted data in a new first set of data objects. The second set of machine-learning models is configured to output a new second set of data objects comprising new attributes identified about the new extracted data. Upon completion of each of the second set of machine-learning models, the method further includes updating the knowledge base using new first set of data objects and the new second set of data objects.

In some embodiments, the method further includes receiving a query, identifying information in the knowledge base based on the query, and triggering execution of a special machine-learning model to generate an output for the query using the information. The method may further include updating the knowledge base using the output.

In some embodiments, the method further includes identifying a "done" file posted by a first machine-learning model from the first or second set of machine learning models and identifying, by the processor, a respective completion status of the first machine-learning model from the first or second set of machine learning models based on a file extension of the done file. The file extension indicates that the first machine-learning model processed all, a set, or none of the plurality of files. In response to determining that the file extension of the done file indicates that the first machine-learning model processed a set of files of the plurality of files the method further includes instructing a second machine-learning model from the first or second set of machine learning models to process the set of files and instructing the first machine-learning model to process a remainder of the plurality of files outside the set of files.

Another embodiment includes a system for generating a knowledge base. The system includes a memory and a processor coupled to the memory. The processor is configured to receive a plurality of files and trigger execution of a first set of machine-learning models to extract data from the plurality of files. Each of the first set of machine-learning models outputs a first set of data objects comprising extracted data from the plurality of files. The processor is further configured to trigger execution of a second set of machine-learning models using the first set of data objects. The second set of machine-learning models are configured to output a second set of data objects. Each data object in the second set of data objects comprises an attribute of a plurality of attributes about the extracted data in the first set of data objects. Moreover, the processor is configured to track a completion status of each of the second set of machine-learning models. Upon completion of each of the second set of machine-learning models, the processor is configured to generate the knowledge base using the first set of data objects and the second set of data objects.

In some embodiments, the first set of data objects are stored in a data storage device, and the processor is further configured to indicate a location of the first set of data objects in the data storage device to the second set of machine-learning models.

In some embodiments, each of the second set of machine-learning models are configured to identify at least one attribute of the plurality of attributes about the extracted data using a machine-learning algorithm.

In some embodiments, wherein the completion status is one of "start", "in progress", or "done". The processor is configured to trigger the execution of the first or second set of machine-learning models by updating the completion status of the first or second set of machine-learning models to "start". Moreover, the processor is configured to receive an indication of that execution of a machine-learning model of the first set of machine-learning models or second set of machine-learning models has been initiated and update the completion status of the machine-learning model to "in-progress". Upon completion of a machine-learning model of the first set of machine-learning models or second set of machine-learning models, the processor is further configured to update the completion status of the machine-learning model to "done".

In some embodiments, the processor is further configured to instruct the second set of machine-learning models to execute a subset of machine-learning models of the second set of machine-learning models in parallel.

In some embodiments, execution of a first subset of machine-learning models of the second set of machine-learning models depends on output of a second subset of machine-learning models of the second set of machine-learning models, and the processor is further configured to instruct the second set of machine-learning models to execute the first and second subset of machine-learning models in a predetermined order.

In some embodiments, the plurality of files comprises structured and/or unstructured data.

In some embodiments, the attributes of the extracted data comprise one or more of: named entity recognition (NER) labels, annotations, or relationships.

In some embodiments, the processor is further configured to identify an exception during the execution of a machine-learning model from the second set of machine-learning models, and iteratively trigger re-execution of the second set of machine-learning models until each of the second set of machine-learning models is executed free of any exceptions.

In some embodiments, the processor is further configured to trigger execution of the second set of machine-learning models to process new extracted data in a new first set of data objects. The second set of machine-learning models is configured to output a new second set of data objects comprising new attributes identified about the new extracted data. Upon completion of each of the second set of machine-learning models, the processor is configured to update the knowledge base using new first set of data objects and the new second set of data objects.

In some embodiments, the processor is further configured to receive a query, identify information in the knowledge base based on the query, and trigger execution of a special machine-learning model to generate an output for the query using the information. The processor may be configured to update the knowledge base based on the output.

In some embodiments, the processor is further configured to identify a done file posted by a first machine-learning model from the first or second set of machine learning models and identify a respective completion status of the first machine-learning model from the first or second set of machine learning models based on a file extension of the done file. The file extension indicates that the first machine-learning model processed all, a set, or none of the plurality of files In response to determining that the file extension of the done file indicates that the first machine-learning model processed a set of files of the plurality of files, the processor is further configured to instruct a second machine-learning model from the first or second set of machine learning models to process the set of files and instructing the first machine-learning model to process a remainder of the plurality of files outside the set of files.

Furthermore, another embodiment includes a non-transitory computer-readable medium having instructions stored thereon that, when executed by at least one computing device, cause the at least one computing device to perform operations. The operations comprise receiving a plurality of files and triggering execution of a first set of machine-learning models to extract data from the plurality of files. Each of the first set of machine-learning models outputs a first set of data objects comprising extracted data from the plurality of files. The operations further comprise triggering execution of a second set of machine-learning models using the first set of data objects. The second set of machine-learning models are configured to output a second set of data objects. Each data object in the second set of data objects comprises an attribute of a plurality of attributes about the extracted data in the first set of data objects. Moreover, the operations comprise tracking a completion status of each of the second set of machine-learning models. Upon completion of each of the second set of machine-learning models, the operations further comprise generating the knowledge base using the first set of data objects and the second set of data objects.

In some embodiments, the first set of data objects are stored in a data storage device, and the operations further comprise indicating a location of the first set of data objects in the data storage device to the second set of machine-learning models.

In some embodiments, each of the second set of machine-learning models are configured to identify at least one attribute of the plurality of attributes about the extracted data using a machine-learning algorithm.

In some embodiments, the completion status is one of "start", "in progress", or "done". Triggering the execution of the first or second set of machine-learning models by updating the completion status of the first or second set of machine-learning models to "start". The operations further comprise receiving an indication of that execution of a machine-learning model of the first set of machine-learning models or second set of machine-learning models has been initiated and updating the completion status of the machine-learning model to "in-progress". Upon completion of a machine-learning model of the first set of machine-learning models or second set of machine-learning models, the operations further comprise updating the completion status of the machine-learning model to "done".

In some embodiments, the operations further comprise instructing the second set of machine-learning models to execute a subset of machine-learning models of the second set of machine-learning models in parallel.

In some embodiments, execution of a first subset of machine-learning models of the second set of machine-learning models depends on output of a second subset of machine-learning models of the second set of machine-learning models, and the operations further comprise instructing the second set of machine-learning models to execute the first and second subset of machine-learning models in a predetermined order.

In some embodiments, the plurality of files comprises structured and/or unstructured data.

In some embodiments, the attributes of the extracted data comprises one or more of: named entity recognition (NER) label, annotations, or relationships.

In some embodiments, the operations further comprise identifying an exception during the execution of a machine-learning model from the second set of machine-learning models and iteratively triggering re-execution of the second set of machine-learning models until each of the second set of machine-learning models is executed free of any exceptions.

In some embodiments, operations further comprise triggering execution of the second set of machine-learning models to process new extracted data in a new first set of data objects. The second set of machine-learning models is configured to output a new second set of data objects comprising new attributes identified about the new extracted data. Upon completion of each of the second set of machine-learning models, the operations further comprise updating the knowledge base using new first set of data objects and the new second set of data objects.

In some embodiments, the operations further comprise receiving a query identifying information in the knowledge base based on the query, and triggering execution of a special machine-learning model to generate an output for the query using the information. The operations may further comprise updating the knowledge base using the output.

In some embodiments, the operations further comprise identifying a done file posted by a first machine-learning model from the first or second set of machine learning models and identifying a respective completion status of the first machine-learning model from the first or second set of machine learning models based on a file extension of the done file. The file extension indicates that the first machine-learning model processed all, a set, or none of the plurality of files. In response to determining that the file extension of the done file indicates that the first machine-learning model processed a set of files of the plurality of files the operations further comprise instructing a second machine-learning model from the first or second set of machine learning models to process the set of files and instructing the first machine-learning model to process a remainder of the plurality of files outside the set of files.

BRIEF DESCRIPTION OF THE FIGURES

The accompanying drawings, which are incorporated herein and form part of the specification, illustrate present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
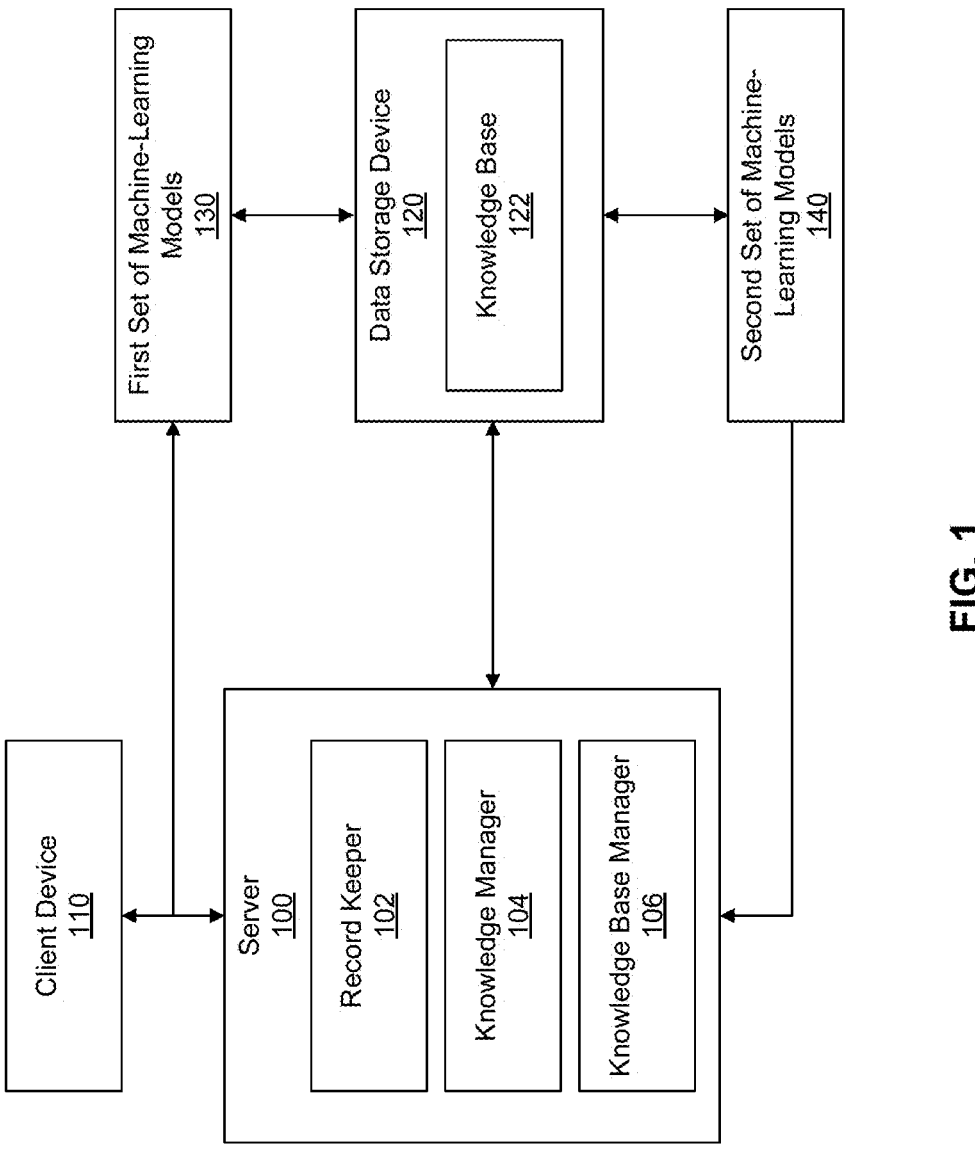
FIG. 1 is a block diagram of an example system for generating a knowledge base, according to some embodiments.

Provided herein are system, apparatus, device, method, and/or computer program product embodiments, and/or combinations and sub-combinations thereof, for generating a knowledge base.

As described above, conventional systems for generating a knowledge base may lack flexibility, scalability, and adaptability. For example, machine-learning models may be used to extract knowledge from files (e.g., documents, spreadsheets, PDFs, databases, etc.). The machine-learning models may use various algorithms, including word embeddings, Natural Language Processing (NPL), neural networks, text extraction, etc., to extract knowledge from the files. The knowledge may be used to generate a knowledge base. This involves large volumes of data and numerous machine-learning models. The data, technology, and machine-learning models may change over time.

However, conventional systems lack the versatility to add new machine-learning models, remove machine-learning models, update machine-learning models, remove files from processing, etc. Additionally, conventional systems are not scalable or adaptable. Specifically, conventional systems cannot accommodate a large number of machine-learning models or a large number of files. In this regard, conventional systems cannot adapt to changes in the machine-learning models, data, or other relevant technology necessary for generating the knowledge base.

Embodiments described herein address these challenges by using a plug-and-analyze framework for generating a knowledge base. In a given embodiment, a server receives a plurality of files. The server triggers execution of a first set of machine-learning models to extract data from the plurality of files. Each of the first set of machine-learning models outputs a first set of data objects comprising extracted data from the plurality of files. The server triggers execution of a second set of machine-learning models using the first set of data objects. The second set of machine-learning models are configured to output a second set of data objects. Each data object in the second set of data objects comprises an attribute of a plurality of attributes about the extracted data in the first set of data objects. The server tracks a completion status of each of the second set of machine-learning models. Upon completion of each of the second set of machine-learning models, the server generates a knowledge base using the first set of data objects and the second set of data objects.

Embodiments described herein provide a flexible, scalable, and adaptable framework for generating a knowledge base. This provides numerous advantages.

For example, embodiments described herein allow for resuming or restarting a machine-learning model if the machine-learning model crashes. Specifically, the machine-learning model may crash due to transient machine failures, network failures, system failures, dependency updates, unsupported type of data, bugs in the algorithms, etc. Furthermore, the machine-learning model may be unable to process certain files because of readability, unsupported data type, file size, etc. As such, the embodiments described herein allow for resuming the machine-learning model at the point of failure. Furthermore, embodiments described herein can selectively restart the machine-learning model to process the unprocessed files.

Moreover, embodiments described herein allow for seamlessly updating the existing machine-learning models, adding new machine-learning models, processing new data, etc. The knowledge extracted by the machine-learning models may be queried and used by new and existing machine-learning models. In this regard, the framework is scalable and adaptable based on the machine-learning models and data being processed.

Furthermore, by seamlessly adding or removing new machine-learning models and data, the knowledge base may be iteratively updated and refined. For example, in an n×m matrix representing a knowledge base, there may be n×m machine-learning models, where each machine-learning model ij output corresponds to in the ij matrix element. Each matrix element is filled in and updated as the machine-learning models are iteratively executed. As new machine-learning models are added, the size of the matrix (e.g., the knowledge base) increases. As such, the embodiments described herein allow for continuously expanding and updating the knowledge base.

FIG. 1 is a block diagram of a system for generating a knowledge base, according to some embodiments. The system may include a server 100, client device 110, and data storage device 120. The devices of the system may be connected through a network. For example, the devices of the system may be connected through wired connections, wireless connections, or a combination of wired and wireless connections. In an example embodiment, one or more portions of the network may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks. Alternatively, server 100, client device 110, and data storage device 120 may be located on a single physical or virtual machine.

In some embodiments, server 100 and data storage device 120 may reside in a cloud-computing environment. In other embodiments, server 100 may reside in a cloud-computing environment, while data storage device 120 resides outside the cloud-computing environment. Furthermore, in other embodiments, server 100 may reside outside the cloud-computing environment, while data storage device 120 resides in the cloud-computing environment.

The system for generating a knowledge base may further include a first set of machine-learning models 130 and a second set of machine-learning models 140. First set of machine-learning models 130 and second set of machine-learning models 140 may reside on one or more servers, which may be the same as or different from server 100. These servers may reside in the cloud-computing environment.

In some embodiments, a user may use client device 110 to transmit files to server 100 for generating knowledge base 122. Client device 110 may also upload the files directly to data storage device 120. The files may include structured or unstructured data. For example, the files may include documents, images, PDF files, spreadsheets, CSV files, etc.

Server 100 may include record keeper 102, knowledge manager 104, and knowledge base manager 106. Record keeper 102 and knowledge manager 104 may use first set of machine-learning models 130 and second set of machine-learning models 140 to extract data from the files and identify attributes about the extracted data to generate knowledge base 122.

Data storage device 120 may be one or more databases configured to store structured and unstructured data. Data storage device 120 may store knowledge base 122. Knowledge base 122 may store unstructured or structured data about an ontology or one or more ontologies. Knowledge base 122 may be represented as search engines, relational databases, graph engines, or any type of software that can be used to fetch the information from knowledge base 122.

First set of machine-learning models 130 may be one or more machine-learning models configured to extract structure and its corresponding data from the files. The files may include documents, images, PDF files, spreadsheets, etc. The data may include title, abstract, page, section, paragraph, tables, images, etc. As a non-limiting example, the one or more machine-learning models may execute data extraction software to extract data from the files. The extracted data may be transformed into machine-readable data. First set of machine-learning models 130 may be configured to output a first set of data objects (e.g., JavaScript Object Notation (JSON) objects) comprising extracted data. The first set of data objects may be stored in data storage device 120.

Second set of machine-learning models 140 may be one or more machine-learning models configured to execute supervised or unsupervised machine-learning algorithms configured to identify attributes about the extracted data or files. The attributes may be targeted information. The supervised or unsupervised machine-learning algorithms may include Natural Language Processing (NLP), neural networks, word embeddings, etc. The supervised or unsupervised machine-learning algorithms may be trained to identify targeted data. For example, the supervised or unsupervised machine-learning algorithms may be configured to assign Name Entity Recognition (NER) labels, extract relationships, annotate text, etc. Second set of machine-learning models 140 may be configured to output a second set of data objects comprising identified attributes about the extracted data or files. The second set of data objects may be stored in data storage device 120.

Knowledge manager 104 may be configured to use the first set of data objects and the second set of data objects to generate or update knowledge base 122. Knowledge base manager 106 may interface with knowledge base 122 to execute queries.

Figure 2:
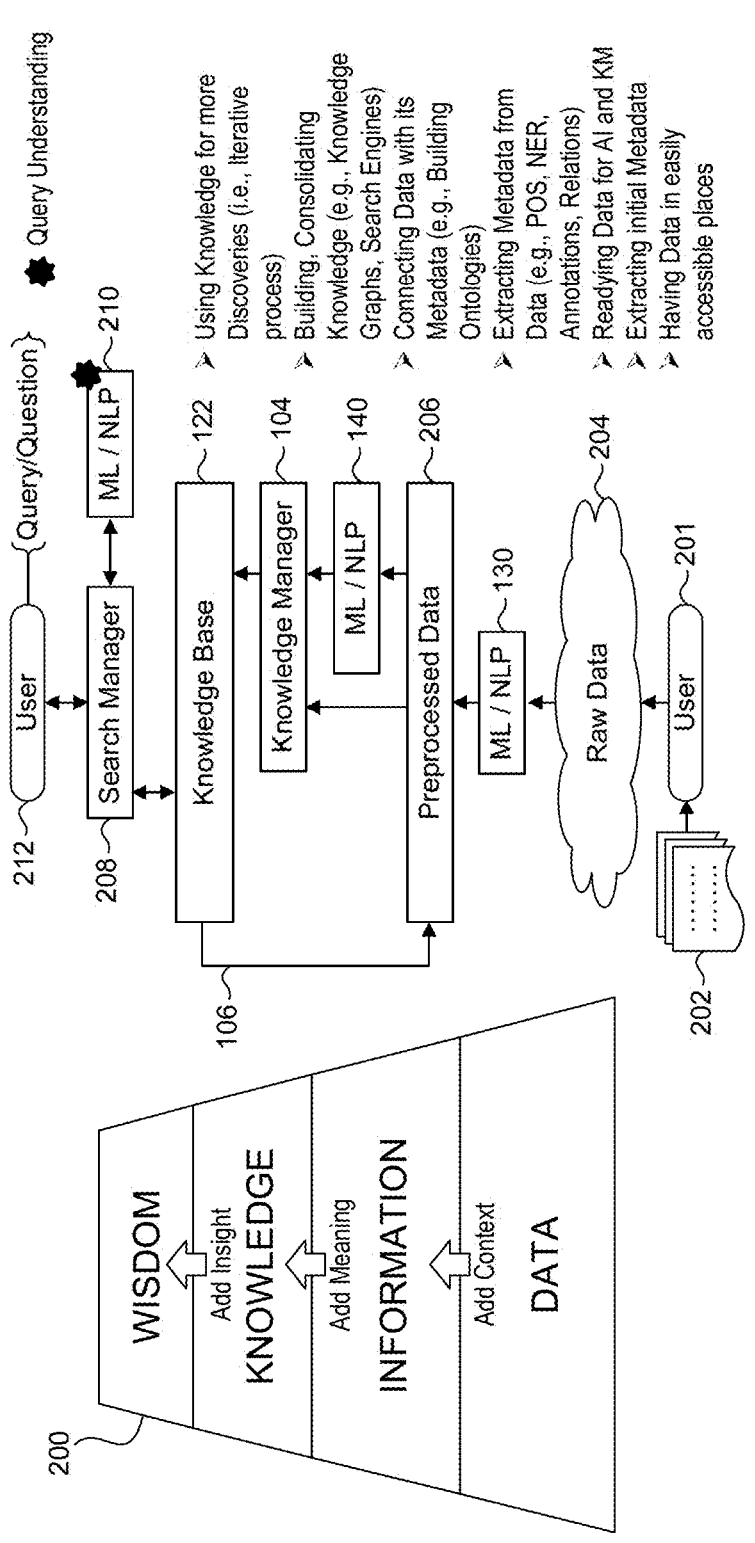
FIG. 2 is a block diagram of data flow in the system for generating a knowledge base, according to some embodiments.

FIG. 2 is a block diagram of data flow in the system for generating a knowledge base, according to some embodiments. FIG. 2 shall be described with reference to FIG. 1.

Roadmap 200, as illustrated in FIG. 2, depicts an overview of generating a knowledge base (e.g., knowledge base 122). As shown in roadmap 200, using first set of machine-learning models 130, data is extracted from files 202, which a user 201 may place in a more accessible location 204, such as data storage device 120, where the first set of machine-learning models 130 can access them. Second set of machine-learning models 140 provides meaning to the extracted data such that it is transformed into information by identifying context and relationships in the extracted data. Knowledge manager 104 may use the identified context and relationships to add insight (e.g., connect the relationships between the data) to transform the information into knowledge in a knowledge base. The knowledge base may be refined over time to be transformed into wisdom, and a knowledge base manager 106 can be used to retrieve existing knowledge from the knowledge base 122 and plug into the preprocessed data 206. From here, the second set of machine-learning models 140 can use it to discover more insights.

In some embodiments, user 201 may upload files 202 to a more accessible location 204, such as data storage device 120, using client device 110. Record keeper 102 may trigger first set of machine-learning models 130 to extract data from this raw data location 204. The extracted data may be document metadata such as document type, subsections of the document/file, text, images, tables, etc. First set of machine-learning models 130 may generate preprocessed data 206. Furthermore, first set of machine-learning models 130 may generate a first set of data objects (such as JSON objects) comprising the preprocessed data 206. Preprocessed data 206 may also be stored in data storage device 120.

Once first set of machine-learning models 130 has generated preprocessed data 206, record keeper 102 may trigger execution of second set of machine-learning models 140. Second set of machine-learning models 140 may extract metadata from preprocessed data 206. The metadata may be Part of Speech (POS) tags, annotations, relationships, NER tags, etc. Second set of machine-learning models 140 may output a second set of data objects, including the metadata.

Once second set of machine-learning models 140 has generated the second set of data objects, record keeper 102 may trigger knowledge manager 104 to generate knowledge base 122, using the second set of data objects, including the metadata and preprocessed data 206. The knowledge base 122 can be made of only one or multiple combinations of knowledge graphs, search engines, relational databases, or any new technology that can be used for knowledge representation and retrieval.

For example, knowledge base 122 can be a knowledge graph which may include nodes connected by edges. Knowledge manager 104 may use the first set of data objects and second set of data objects to populate the nodes with data about a given ontology. Furthermore, knowledge manager 104 may identify relationships between the nodes based on the metadata in the second set of data objects. For example, the metadata in the second set of data objects may provide context to the extracted data. Knowledge manager 104 may connect the nodes in knowledge base 122 based on the identified relationship.

Knowledge base 122 may be iteratively refined based on existing and new data. That is, record keeper 102 may automatically trigger execution of first set of machine-learning models 130 or second set of machine-learning models 140 as new data is uploaded to server 100 or data storage device 120. Knowledge manager 104 may automatically update or refine knowledge base 122 based on new batch outputs posted to processing data stack 308.

User 212 may transmit a query to the search manager 208, which can reside on server 100 using client device 110. The search manager 208 may trigger a special machine-learning model 210 to process the query. Special machine-learning model 210 may be configured to translate the query and the search manager 208 may use the output of the machine-learning model 210 to retrieve the relevant data from the knowledge base 122.

Figure 3:
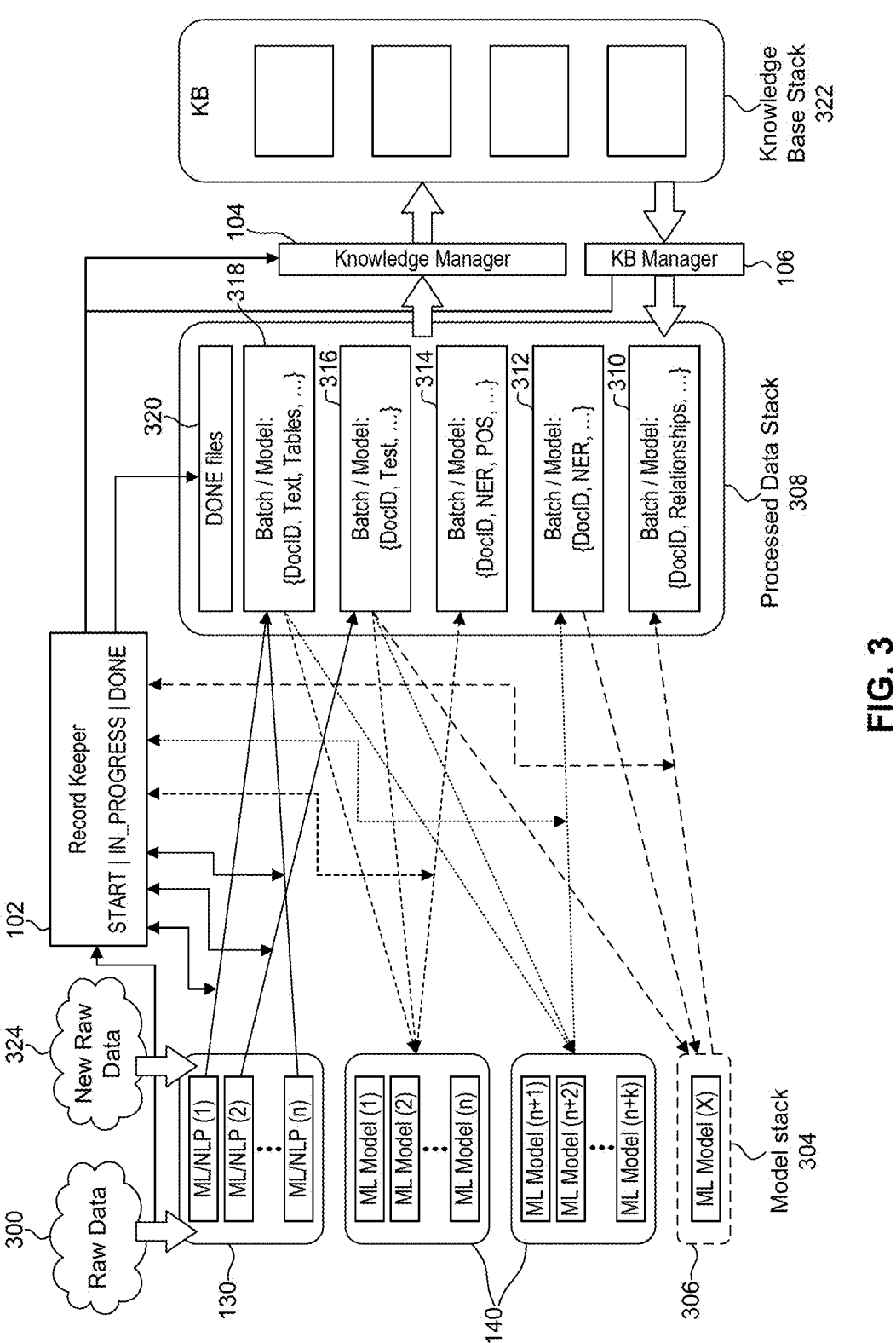
FIG. 3 is a block diagram of components of the system for generating a knowledge base, according to some embodiments.

FIG. 3 is a block diagram of components of the system for generating a knowledge base, according to some embodiments. FIG. 3 shall be described with reference to FIG. 1.

In some embodiments, the components of the system for generating a knowledge base may include model stack 304, processed data stack 308, and knowledge base stack 322.

Model stack 304 may include first set of machine-learning models 130, second set of machine-learning models 140, and special machine-learning models 306. Processed data stack 308 may include batch outputs generated by first set of machine-learning models 130, second set of machine-learning models 140, and special machine-learning models 306, which use the output of previously used machine-learning models from either first or second set of machine-learning models, or both, and/or the existing knowledge from the knowledge base stack 322 using the knowledge base manager 106 services. Batch outputs may include extracted data or identified attributes of multiple files (e.g., batch files). The batch outputs may be stored in data storage device 120. The extracted data or identified attributes may be grouped based on the corresponding file in the batch outputs. This allows for easy curation of knowledge base 122. Specifically, knowledge base 122 may be cleaned up or refined by identifying documents with bad data or meta-data using the batch outputs. Knowledge base stack 322 may include representations of knowledge base 122. The representations may include a search engine, knowledge graph, relational database, etc.

The machine-learning models of first set of machine-learning models 130 and second set of machine-learning models 140 (in model stack 304) may be registered with record keeper 102. Furthermore, the registration of the machine-learning models of first set of machine-learning models 130 and second set of machine-learning models 140 may account for the dependencies between the machine-learning models. The registration may indicate that a first machine-learning model of first set of machine-learning models 130 or second set of machine-learning models 140 depends on an output of a second machine-learning model of first set of machine-learning models 130 or second set of machine-learning models 140 to record keeper 102. As such, record keeper 102 may determine that the second machine-learning model is to be executed before the first machine-learning model.

Record keeper 102 may track the completion status of each of the machine-learning models of first set of machine-learning models 130 or second set of machine-learning models 140 that have been triggered for execution. To this end, record keeper 102 may maintain a data structure, such as a list, which indicates the completion status of each of first set of machine-learning models 130 or second set of machine-learning models 140. The completion status may be start, in-progress, and done.

Record keeper 102 may trigger execution of a machine-learning model from first set of machine-learning models 130 or second set of machine-learning models 140 by placing the machine-learning model under the start completion status on the list. By doing so, record keeper 102 updates the completion status of the machine-learning model to start. If a subset of machine-learning models of first set of machine-learning models 130 or second set of machine-learning models 140 are to be executed in parallel, record keeper 102 may include each of the subset of machine-learning models in the start completion status of the list.

Record keeper 102 may receive a message from a machine-learning model once it initiates execution. Record keeper 102 may update the completion status of the machine-learning model by moving the machine-learning model from start to the in-progress completion status on the list in response to receiving the message. Record keeper 102 receives another message from the machine-learning model when it completes its execution. Record keeper 102 updates the completion status of the machine-learning model by moving the machine-learning model from in-progress to the done completion status on the list in response to receiving the message.

Record keeper 102 also posts a done file 320 in processing data stack 308, indicating the completion of the machine-learning model. The done file 320 can be a dummy file used simply for triggering the next event, or may contain useful information from the corresponding machine-learning model, such as the start and end times, the input and output data, details of the files processed, etc. In the event a first machine-learning model from first set of machine-learning models 130 or second set of machine-learning models 140 depends on the output of a second machine-learning model from first set of machine-learning models 130 or second set of machine-learning models 140, the second machine-learning model is triggered for execution based on done file 320 corresponding to the first machine-learning model being posted to processing data stack 308. In this regard, record keeper 102 may trigger execution of one or more machine-learning models from first set of machine-learning models 130 or second set of machine-learning models 140 in a predetermined order based on the dependencies of the machine-learning models.

The done completion status in the list may comprise a success status data structure for each machine-learning model in the done completion status on the list. The value of the success status data structure may be either success or failure. As such, the success status data structure may indicate whether a machine-learning model from first set of machine-learning models 130 or second set of machine-learning models 140 successfully processed the files/data. This may indicate whether the machine-learning model processed all, some, or none of the files/data.

Record keeper 102 may also maintain a different list (e.g., START_MODEL list) containing all the machine-learning models and their execution order information. All of the machine-learning models on a different list are the machine-learning models that are to be executed. Record keeper may copy machine-learning models on the different list to the start completion status of the list when triggering execution of the respective machine-learning models.

Raw data (e.g., files) 300 may be uploaded to server 100. In some embodiments, raw data 300 may be uploaded to data storage device 120. Record keeper 102 may determine that raw data 300 is to be processed by first set of machine-learning models 130 and second set of machine-learning models 140.

Record keeper 102 may trigger execution of first set of machine-learning models 130. Record keeper 102 may transmit raw data 300 to first set of machine-learning models 130. In some embodiments, record keeper 102 may trigger execution of one, some, or all of the machine-learning models of first set of machine-learning models 130. In other embodiments, record keeper 102 may instruct first set of machine-learning models 130 to execute a subset of first set of machine-learning models 130 in parallel. In other embodiments, execution of a first subset of first set of machine-learning models 130 may depend on the output of a second subset of first set of machine-learning models 130. As such, record keeper 102 may trigger execution of the first and second subset of first set of machine-learning models 130 in a predetermined order.

In some embodiments, a first machine-learning model of first set of machine-learning models 130 or second set of machine-learning models 140 may output a first set of data objects or a second set of data objects for each file that is processed. As such, if a second machine-learning model of first set of machine-learning models 130 or second set of machine-learning models 140 depends on the output of the first machine-learning model, second machine-learning models may start processing the files using the first machine-learning model's output of the files that the first machine-learning model has processed. That is, the second machine-learning model may process the files as the first machine-learning model outputs the first or second set of data objects while the first machine-learning model is being executed.

As indicated above, first set of machine-learning models 130 may be configured to extract data from raw data 300. Each machine-learning model of first set of machine-learning models 130 may execute a different machine-learning algorithm to extract text. Furthermore, each machine-learning model of first set of machine-learning models 130 may be configured to extract different types of data.

First set of machine-learning models 130 may output batch outputs. The batch outputs may include a first set of data objects comprising the extracted data. First set of machine-learning models 130 may post the batch outputs to processing data stack 308. For example, first set of machine-learning models 130 may post batch output 318 and 316 to processing data stack 308.

Upon completion of first set of machine-learning models 130, record keeper 102 may trigger execution of second set of machine-learning models 140. In some embodiments, record keeper 102 may trigger execution of one, some, or all of the machine-learning models of second set of machine-learning models 140. In other embodiments, record keeper 102 may instruct second set of machine-learning models 140 to execute a subset of second set of machine-learning models 140 in parallel. In other embodiments, execution of a second subset of first set of machine-learning models 140 may depend on the output of a second subset of second set of machine-learning models 140. As such, record keeper 102 may trigger execution of the first and second subset of second set of machine-learning models 140 in a predetermined order. Record keeper 102 may trigger execution of the machine-learning models from second set of machine-learning models 140 and track their completion status as described above.

Some of the machine-learning models of second set of machine-learning models 140 may use batch outputs 316 or 318 generated by the machine-learning models of first set of machine-learning models 130. As such, upon triggering the machine-learning models of second set of machine-learning models 140, record keeper 102 may indicate the location of batch outputs 316 or 318 in processing data stack 308 to the machine-learning models when triggering their execution. In the event a first machine-learning model of second set of machine-learning model 140 depends on the output of a second machine-learning model of second set of machine-learning model 140, the first machine-learning model is triggered for execution based on done file 320 corresponding to the second machine-learning model being posted to processing data stack 308.

As indicated above, second set of machine-learning models 140 may execute machine-learning algorithms configured to identify attributes about the extracted data. The attributes may be metadata, such as POS labels, NER labels, annotations, relationships, etc. Each machine-learning model of second set of machine-learning models 140 may execute a different machine-learning algorithm to identify attributes. Furthermore, each machine-learning model of second set of machine-learning models 140 may be configured to identify different types of attributes.

Second set of machine-learning models 140 may output batch outputs. The batch outputs may be a second set of data objects comprising the identified attributes. Second set of machine-learning models 140 may post the batch outputs to processing data stack 308. For example, second set of machine-learning models 140 may post batch outputs 312 and 314 to processing data stack 308. In the event, a first machine-learning model of second set of machine-learning models 140 depends on the batch output of a second machine-learning model of second set of machine-learning models 140, record keeper 102 may indicate the location of the batch output of the second machine-learning model to the first machine-learning model.

Upon completion of the machine-learning models of second set of machine-learning models 140, record keeper 102 may trigger knowledge manager 104 to generate knowledge base 122 using batch outputs 312-318. Knowledge manager 104 may be part of knowledge manager 104. Knowledge manager 104 may generate the representations in knowledge back stack 322 of knowledge base 122 using batch outputs 312-318. In some embodiments, knowledge manager 104 may selectively include the data of the batch outputs 312-318 in a given representation based on the data's location and type.

Server 100 may receive new data 324. New data 324 may be new files. Record keeper 102 may trigger execution of and track the completion status of first set of machine-learning models 130 and second set of machine-learning models 140 with new data 324, as described above with respect to raw data 300. Once first set of machine-learning models 130 and second set of machine-learning models 140 have processed the new data and posted their batch outputs to processing data stack 308, record keeper 102 may trigger knowledge manager 104 to refine and update knowledge base 122 based on the batch outputs. To this end, the representations of knowledge base 122 in knowledge base stack 322 may be refined and updated based on the batch outputs.

Knowledge base 122 may be iteratively refined as new data is received by server 100. In this regard, each time a machine-learning model from first set of machine-learning models 130 or second set of machine-learning models 140 outputs a new batch output, the new batch output overwrites the previous batch output by the machine-learning model.

In some embodiments, server 100 may receive a query to retrieve data from knowledge base 122. Record keeper 102 may trigger knowledge base manager 106 to process the query.

In some embodiments, the special machine-learning models 306 need input data from one or more machine-learning models from either the first set of machine-learning models 130 or the second set of machine-learning models 140 or both, and this information is registered with the record keeper 102. Once the dependent models are finished, the record keeper 102 posts the corresponding done files, which, in return, trigger the special machine-learning models 306 execution.

In some embodiments, if the data needed by the special machine-learning models 306 is from the knowledge base 122 (e.g., graph embeddings, feature engineering, or tabular data in one or more of the knowledge base stack 322 representations), knowledge base manager 106 may retrieve the data and post the data in processed data stack 308. Knowledge base manager 106 may indicate the location of the data in processed data stack 308 to machine-learning model 306 via the record keeper 102 and its done file 320 mechanism.

These special machine-learning models 306, which need input data from one or more machine-learning models from either the first set of machine-learning models 130 or the second set of machine-learning models 140 or both, and/or from the knowledge base 122, may be present at different levels within the model stack 304, or may be triggered independently by registering only the special machine-learning models 306 with the record keeper 102, once their input data is produced in the knowledge base 122.

Upon completion of special machine-learning model 306, record keeper 102 may post a done file in done files 320, indicating the completion of special machine-learning model 306. In response to posting the done file, the one or more machine-learning models may initiate their execution. Record keeper 102 may indicate the location of batch output 310 in processing data stack 308 to the one or more machine-learning models following the special machine-learning model 306 down the model stack 304.

The one or more machine-learning models may generate batch outputs and post the batch outputs to processing data stack 308. In response to the one or more machine-learning models posting the batch outputs, record keeper 102 may trigger Knowledge manager 104 to update knowledge base 122. Knowledge manager 104 may use the batch outputs from the one or more machine-learning models and batch output 310 to refine further and update knowledge base 122. In some embodiments, knowledge manager 104 may include the data in the batch outputs from the one or more machine-learning models and batch output 310 for a given representation of knowledge base 122 based on the data's location and type.

Knowledge base 122 may include data associated with a particular field. For example, the field may include pharmacovigilance, information technology, finance, fintech, pharma, biotech, law, etc. To this end, knowledge base 122 may include one or more ontologies associated with the field. A user may use client device 110 to query representations of knowledge base 122 to retrieve data about the particular field.

As a non-limiting example, knowledge base 122 may store one or more ontologies associated with the field of clinical drug trials. Server 100 may receive files or raw data 300 associated with clinical trials. Raw data 300 may include MICROSOFT EXCEL files, comma-separated value (CSV) files, PDF files, and MICROSOFT WORD documents. Raw data 300 may include structured or unstructured data associated with the clinical trials. For example, the data may include clinical trial locations, drug information (e.g., drug type, name, dosage, etc.), subject information (e.g., name, location, ID, age, demographic data, etc.), effects of the drug on a subject, information about the entity administrating the trial, etc.

Record keeper 102 may trigger execution and track completion status of one or more machine-learning models of first set of machine-learning models 130 as described above to transform raw data 300 into machine-ready type data. The one or more first set of machine-learning models 130 may extract data such as title, abstract, page, section, paragraph, text, tables, images, etc., from raw data 300. The one or more first set of machine-learning models 130 may generate a first set of data objects (e.g., JSON objects) comprising the extracted data. The one or more first set of machine-learning models 130 may post batch outputs, including the first set of data objects in processing data stack 308.

Upon completion of the one or more machine-learning models of first set of machine-learning models 130, record keeper 102 may trigger execution of one or more machine-learning models of second set of machine-learning models 140 to extract targeted information from the first set of data comprising the extracted data. Record keeper 102 may trigger execution and track completion status of one or more machine-learning models of second set of machine-learning models 140 as described above.

Second set of machine-learning models 140 may be trained to extract targeted information from the first set of data objects. Second set of machine-learning models 140 may be open-source, pre-trained and ready for use, trained in-house, or built and trained in-house.

As non-limiting examples, a machine-learning model from second set of machine-learning models 140 may extract ORGANIZATION from the extracted data, while another machine-learning model from second set of machine-learning models 140 may extract PERSON from the extracted data, while yet another machine-learning model from second set of machine-learning models 140 may extract CLINICAL_PROTOCOL_NUMBER from the extracted data. Furthermore, other machine-learning models from second set of machine-learning models 140 and/or the special machine-learning models 306 may extract DRUG, DOSAGE, DATE, INDICATION, LEAD_INSTITUTE, LEAD_INVESTIGATOR, PATIENT, GENE, DISEASE, etc., from the extracted data. Some machine-learning models from the second set of machine-learning models 140 may categorize files based on EMAIL, CLINICAL_PROTO-COL, BILLING, drug trial outcome (e.g., positive or negative outcome), etc.

Special machine-learning models 306 may use the output of other machine-learning models from second set of machine-learning models 140, and/or the existing knowledge from the knowledge base 122. For example, a first machine-learning model from second set of machine-learning models 140 may extract PERSON annotations from the extracted data. The special machine-learning model 306 may use the PERSON annotations to identify if that person is a LEAD_INVESTIGATOR in a clinical study. In another example, the first machine-learning model from second set of machine-learning models 140 may extract ORGANIZA-TION annotations. The special machine-learning model may use the ORGANIZATION annotations to identify if that ORGANIZATION is a LEAD_INSTITUTE in a particular clinical trial study.

Second set of machine-learning models 140 may extract the targeted data. By doing so, second set of machine-learning models 140 may identify attributes about the extracted data. Second set of machine-learning models 140 may output batch outputs, including the identified attributes. Knowledge manager 104 may use the batch outputs to generate knowledge base 122.

A user may query knowledge base using client device 110. For example, a user may input the following query: "Why did the drug dosage quantity change years ago?" Server 100 may receive the query. Knowledge base manager 106 may retrieve the node in the knowledge graph representation of knowledge base 122 when the DOSE quantity changed to the particular amount and inspect the surrounding relationships and node entries.

In another example, a user inputs a query to determine if person X is a lead investigator. Server 100 may receive the query. Knowledge base manager 106 may locate data associated with person annotations and lead investigator annotations from knowledge base 122. Knowledge base manager 106 may trigger execution of special machine-learning model 306. Knowledge base manager 106 may indicate the location of the data associated with person annotations and lead investigator annotations from knowledge base 122.

Special machine-learning model 306 may determine if person X is a lead investigator based on the data associated with person annotations and lead investigator annotations. Special machine-learning model 306 may generate a batch output including data associated with whether person X is a lead investigator and post the batch output to processing data stack 308.

Record keeper 102 may identify machine-learning models from first set of machine-learning models 130 or second set of machine-learning models 140 that are configured to process person annotations and lead investigator annotations. Record keeper 102 may trigger execution of the machine-learning models by changing their completion status to start on the list. Record keeper 102 may post done file 320 to processing data stack 308 corresponding to special machine-learning model 306. In response to record keeper 102 posting done file 320 to processing data stack 308 corresponding to special machine-learning model 306, the machine-learning models may initiate execution. Record keeper 102 may indicate the location of the batch output of special machine-learning model 306.

The machine-learning models may identify new attributes about person annotations and lead investigator annotations based on the batch output of special machine-learning model 306. The machine-learning models may output batch outputs including the new attributes based on the batch output of special machine-learning model 306 and post the batch outputs to processing data stack 308. Knowledge manager 104 may update/refine knowledge base 122 based on the batch outputs.

Figure 4:
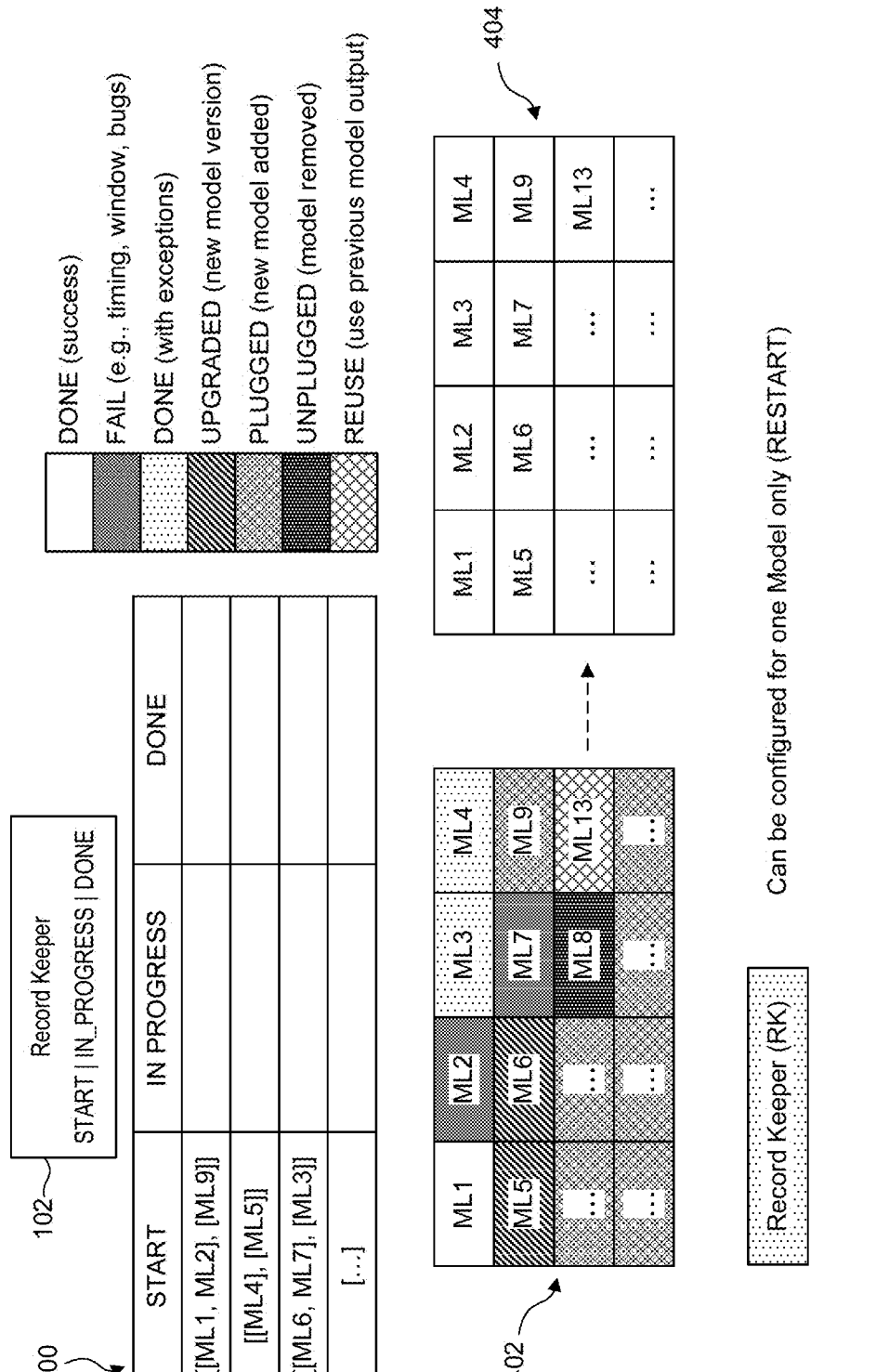
FIG. 4 is a block diagram of a list maintained by the record keeper and a table indicating the success or failure of machine-learning models, according to some embodiments.

FIG. 4 is a block diagram of a list maintained by the record keeper and a table indicating the success or failure of machine-learning models, according to some embodiments. FIG. 4 shall be described with reference to FIG. 1.

As indicated above, record keeper 102 may maintain list 400, indicating a completion status of the machine-learning models. The completion status may be "start," "in-prog-ress," or "done." As a non-limiting example, list 400 include machine-learning models ML1, ML2, ML3, ML4, ML5, ML6, ML7, ML8, and ML9. ML1-ML9 may be part of first set of machine-learning models 130 or second set of machine-learning models 140. Alternatively, one or more of ML2-ML9 may be a special machine-learning model 306.

Record keeper 102 may trigger execution of ML1-ML9 by moving ML1-ML9 into the start completion status of list 400. List 400 may also indicate a predetermined order of executing ML1-ML9. For example, list 400 indicates ML1 and ML2 may be executed in parallel, and ML9 is to be executed after ML1 and ML2. To this end, ML9 may depend on the output of ML1 or ML2. List 400 may also indicate ML4 is to be executed before ML5. ML5 may depend on the output of ML4. List 400 may further indicate that ML6 is to be executed before ML7 and ML7 is to be executed before ML3. ML7 may depend on the output of ML6, and ML3 may depend on the output of ML7.

Table 402 indicates a success status of ML1-ML9. As indicated above, ML1-ML9 may be configured to extract data from files or identify attributes about the extracted data. Record keeper 102 may track the progress of ML1-ML9. Each of ML1-ML9 may successfully complete its execution without any exceptions or errors.

Alternatively, one or more of ML1-ML9 may complete its execution with one or more exceptions or errors. The success status data structure of the one or more of ML1-ML9 in record keeper 102 may include a non-empty failure object. So, while the one or more of ML1-ML9 executed without failing or crashing, record keeper 102 may understand that a portion of the files or extracted data were not processed by the one or more of ML1-ML9. The non-empty failure object within the record keeper for the corresponding model may contain the list of files or data that could not be processed.

The exceptions or errors may be caused, for example, by files that cannot be processed (e.g., due to readability, unsupported data, size etc.). In this scenario, record keeper 102 may track the files or extracted data that remain unprocessed by the respective one or more of ML1-ML9 based on the batch output of the one or more of ML1-ML9. Record keeper 102 may also indicate the files or extracted data that remain unprocessed in the done files of the one or more of ML1-ML9. This way, if another machine-learning model of ML1-ML9 depends on the one or more of the ML1-ML9, the other machine-learning model will be alerted a portion of the files or extracted data remains unprocessed.

The exception or error may, for example, be associated with corrupt or illegible data. Alternatively, the exception or error may, for example, be associated with an algorithm of the one or more of ML1-ML9. An administrator or separate system may attempt to resolve the error or exception. Once the exception or error is resolved, record keeper 102 may restart the execution of the one or more of the ML1-ML9 to process the remaining data or files. Record keeper 102 may also restart the execution of any of ML1-ML9 that may depend on the batch output of the one or more of ML1-ML9.

In some embodiments, one or more of ML1-ML9 may fail. When a machine-learning model fails, it catches an exception and cannot continue. In this scenario, the machine-learning model transmits a message to record keeper 102 about the failure. The message includes the last successful processed file. For example, the message may include the document ID of the last successfully processed file. Alternatively, the record keeper 102 may monitor ML1-ML9 to identify failures.

The cause of failure may be, for example, transient machine failures, network failures, system or its dependency upgrades, unsupported type of data, bugs in the algorithms, dependency changes, etc. An administrator or a different system may resolve the issues that caused the failure. Once the issues are resolved, record keeper 102 may resume the execution of the one or more ML1-ML9 to process the remaining files or extracted data. Record keeper 102 may identify the remaining files or extracted data to be processed based on the document ID of the last successfully processed file. Record keeper 102 may also resume the execution of any of ML1-ML9 that may depend on the batch output of the one or more of ML1-ML9.

In some embodiments, one or more of ML1-ML9 may be newly plugged in or added to the system to generate the knowledge base. The one or more of ML1-ML9 that are newly plugged in may be registered with record keeper 102. Alternatively, one or more of ML1-ML9 may be unplugged or removed from the system for generating the knowledge base. A message may be transmitted to record keeper 102 that one or more of ML1-ML9 has been unplugged. This allows the system of generating a knowledge base to scale based on need.

Table 402 indicates that ML1 was executed successfully without any exceptions, ML2 and ML7 failed, ML3 and ML4 encountered one or more exceptions during execution, ML5 and ML6 were upgraded, ML9 was plugged or newly added, ML8 was unplugged or removed from execution, and ML13 may reuse output from one or more of ML1-ML9. The visual output of different colors (which may alternatively or additionally include different patterns) assist a monitor in easily identifying a success status of each ML model. In this way, a monitor can also easily identify specific ML models having issues/complications.

Record keeper 102 may iteratively trigger execution of ML1-ML9 and ML13 until each of ML1-ML9 and ML13 are successfully executed, as shown in table 404. The visual output of a color or pattern being associated with a particular ML model's "done" success status assists a monitor in easily identifying when the overall process is successful.

Figure 5:
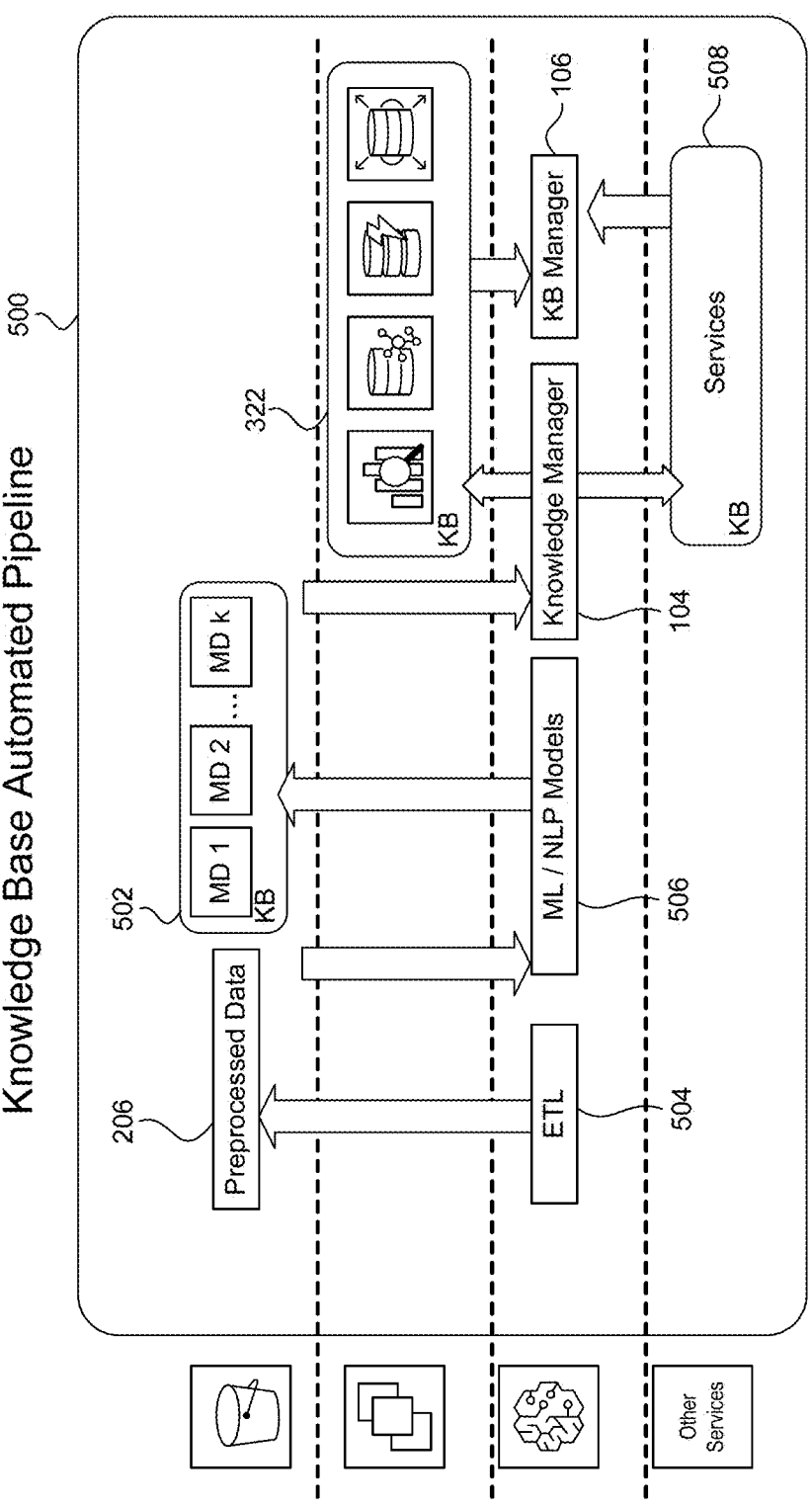
FIG. 5 illustrates a pipeline for the system for generating a knowledge base, according to some embodiments.

FIG. 5 illustrates a pipeline for the system for generating a knowledge base, according to some embodiments. FIG. 5 will be described with reference to FIGS. 1-3.

Pipeline 500 may include preprocessed data 206. Preprocessed data 206 may be extracted data from files using first set of machine-learning models 130. Extract transform and load tools 504 may be used to extract and load the data in data storage device 120. Extract transform and load tools 504 may be machine-learning models of first set of machine-learning models 130.

ML/NLP models 506 may be machine-learning models of second set of machine-learning models 140. ML/NLP models 506 may use preprocessed data 206 to identify attributes about preprocessed data 206. ML/NLP models 506 may output batch outputs 502 (e.g., MD 1, MD 2, . . . MD k). Batch outputs 502 may be stored in data storage device 120.

Knowledge manager 104 may generate knowledge base 122 using batch outputs 502. Knowledge base 122 may be stored in data storage device 120. Knowledge manager 104 may also generate representations of knowledge base 122 in knowledge base representation bank 322. The representations may comprise search engines, relational databases, graph engines, or any type of software that can be used to fetch the information stored within. The representations may be embodied as services executed to fetch information in knowledge base 122. Knowledge manager 104 may use services 508 to generate the representations. Services 508 may include graph database management tools, search engine interface tools, and other database tools.

Knowledge base manager 106 may be used to execute queries on knowledge base 122. For example, knowledge base manager 106 may use representations of knowledge base 122 in knowledge base representation bank 322 to retrieve information from knowledge base 122. Knowledge base manager 106 may use service 508 to execute the queries on knowledge base 122.

Pipeline 500 illustrates a microservices architectural framework for the system for generating a knowledge base. Each machine-learning model is treated individually based on its needs, upgrades, failures, etc. This allows for plugging and unplugging the machine-learning models in a non-disruptive way. To this end, knowledge base 122 is iteratively updated by the successful machine-learning models. This again allows for plugging (e.g., adding existing upgraded machine-learning models, new machine-learning models) and unplugging machine-learning models (e.g., due to performance and efficiency issues). Knowledge base 122 may be automatically updated or refined.

Moreover, pipeline 500 allows for adding new machine-learning models, which can reuse existing knowledge. Furthermore, knowledge base 122 may be curated, updated, and upgraded by updating or upgrading existing machine-learning models.

Figure 6:
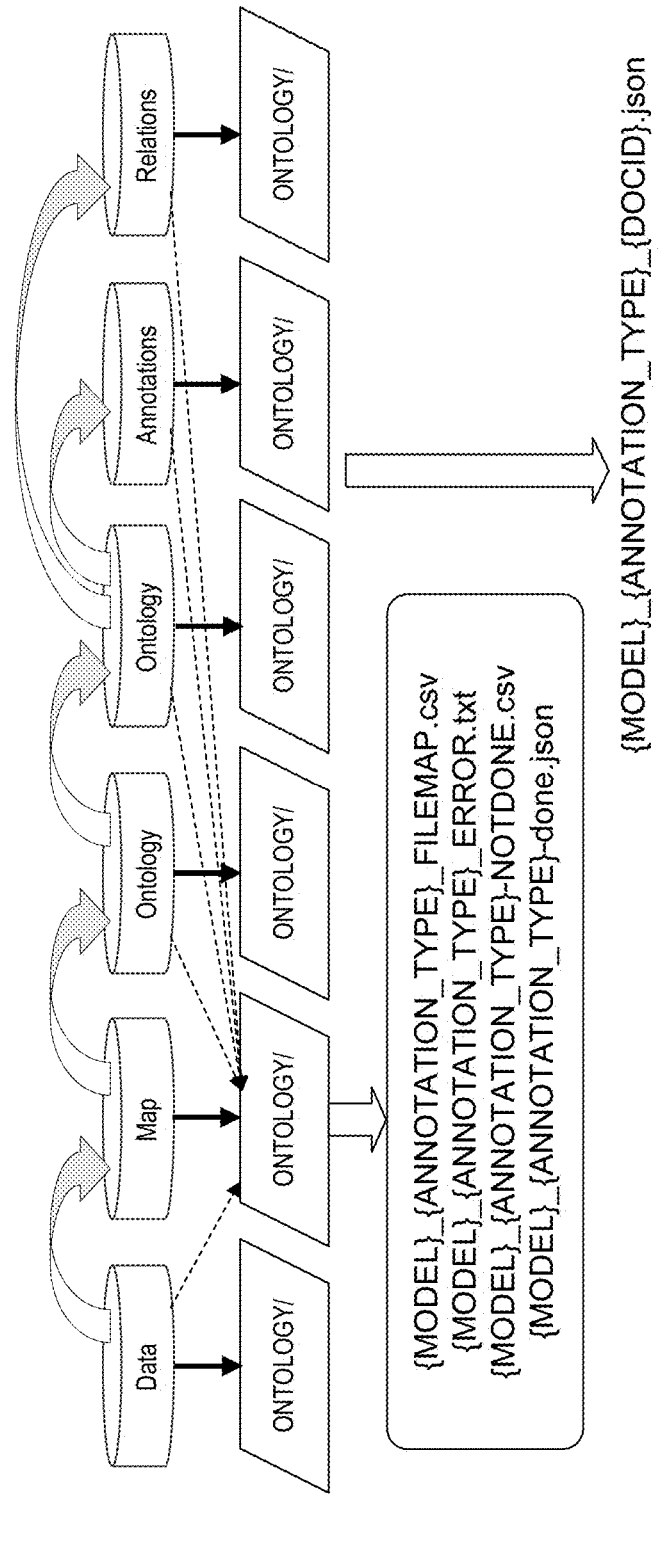
FIG. 6 illustrates batch outputs from the first or second set of machine-learning models, according to some embodiments.

FIG. 6 illustrates batch outputs from the first or second set of machine-learning models, according to some embodiments. FIG. 6 is described with reference to FIG. 1.

As indicated above, record keeper 102 may post a done file corresponding to a machine-learning model of first set of machine-learning models 130 and second set of machine-learning models 140. The file names of the done file may include the model label, analysis type, and done extension.

The model label may be an identifier associated with the respective machine-learning model. The analysis type may be the type of algorithm executed by the respective machine-learning model.

The "done" extensions may be, for example, "filemap," "error," "notdone," and "done." "Filemap" may be a CSV file mapping the extracted data or identified attributes mapped to the respective file. "Error" may indicate that the respective machine-learning model encountered an error or exception during the execution. "Notdone" may indicate that the respective machine-learning model failed to process certain files that can be identified by a document id. "Done" may indicate that the respective machine-learning model was successfully executed.

The machine-learning models of first set of machine-learning models 130 and second set of machine-learning models 140 may output batch outputs. The file names of the batch outputs may include model label, analysis type, and document ID.

Document ID may indicate the last processed file by the machine-learning model outputting the batch output. Document ID may be generated for each file being processed. Record keeper 102 may maintain a file map (e.g., a CSV file) that lists all of the files being processed and their respective document ID.

Figure 7:
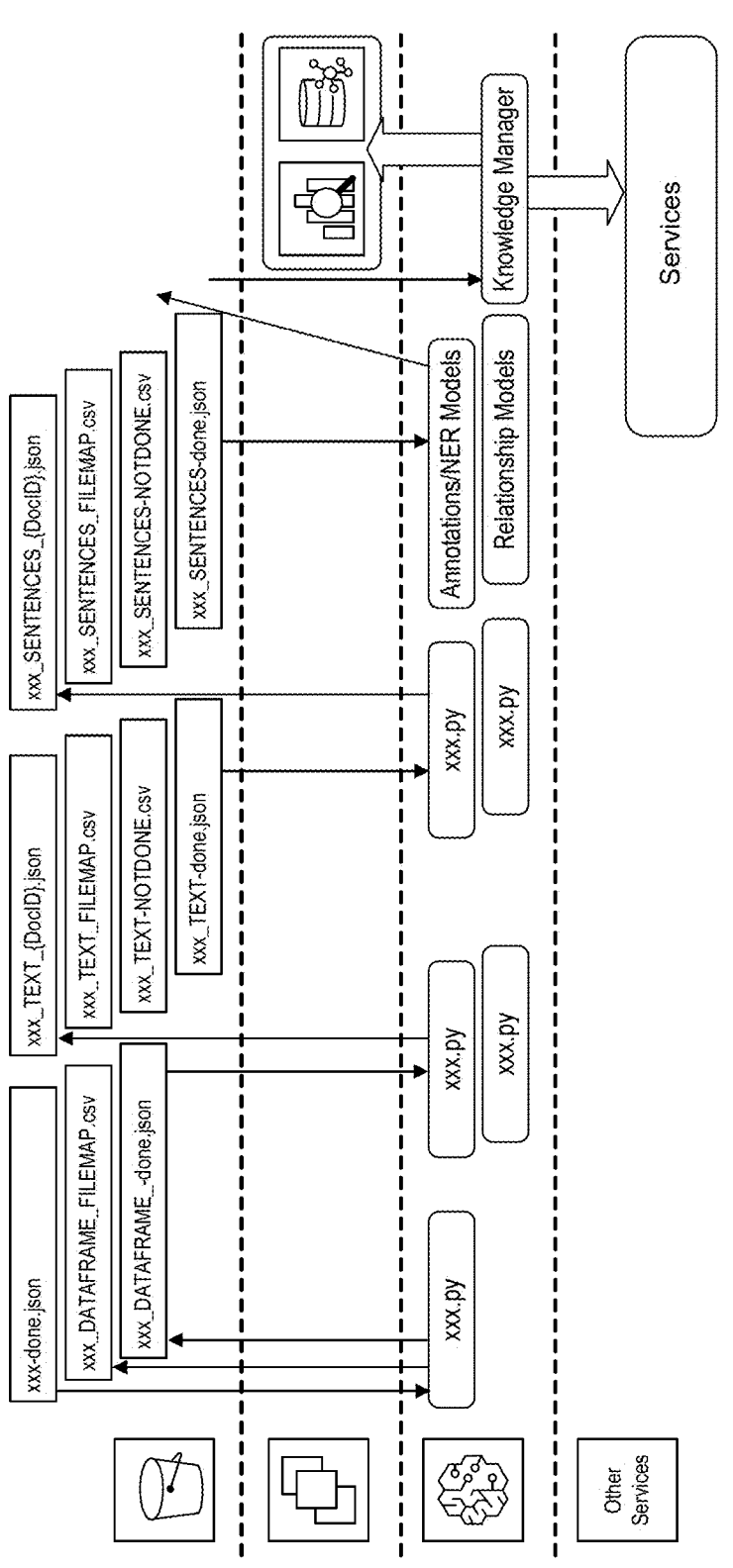
FIG. 7 illustrates example files received and output by the first or second set of machine-learning models, according to some embodiments.

FIG. 7 illustrates example files received and output by the first or second set of machine-learning models, according to some embodiments. FIG. 7 shall be described with reference to FIG. 1.

Data storage device 120 may store the raw data (e.g., files) to be processed. Furthermore, data storage device 120 may store the batch outputs output by first set of machine-learning models 130 or second set of machine-learning models 140. As a non-limiting example, first set of machine-learning models 130 or second set of machine-learning models 140 may output JSON objects. The JSON objects may include extracted data or identified attributes about the extracted data. First set of machine-learning models 130 or second set of machine-learning models 140 may also process the extracted data or identified attributes in the JSON objects. As indicated above, knowledge manager 104 may use the batch outputs to generate representations of knowledge base 122.

Figure 8:
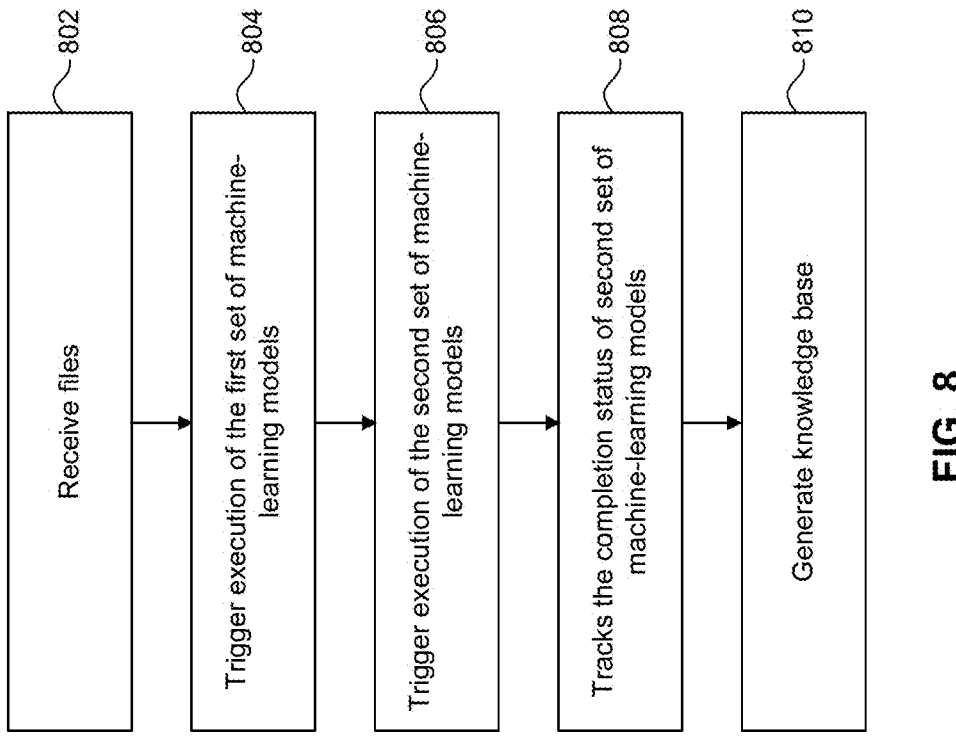
FIG. 8 is a flowchart illustrating the process for generating a knowledge base, according to some embodiments.

FIG. 8 is a flowchart illustrating the process for generating a knowledge base, according to some embodiments. Method 800 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 8, as will be understood by a person of ordinary skill in the art.

Method 800 shall be described with reference to FIG. 1. However, method 800 is not limited to that example embodiment.

In operation 802, server 100 receives files to be processed by first set of machine-learning models 130 and second set of machine-learning models 140. The files may include structured or unstructured data. The data may be text or images.

In operation 804, record keeper 102 triggers execution of execution of first set of machine-learning models 130 to extract data from the files. First set of machine-learning models 130 outputs a first set of data objects comprising the extracted data from the files. Record keeper 102 may track the completion status of first set of machine-learning models 130. For example, record keeper 102 may maintain the completion status of first set of machine-learning models 130 in a list. The completion status may be, for example, start, in-progress, or done. Record keeper 102 may trigger execution of first set of machine-learning models 130 by moving the respective machine-learning models 130 into the start completion status on the list.

In operation 806, record keeper 102 triggers execution of second set of machine-learning models 140 using the first set of data objects. Second set of machine-learning models 140 are configured to output a second set of data objects comprising attributes about the extracted data in the first set of data objects. Record keeper 102 may trigger execution of second set of machine-learning models 140 upon completion of first set of machine-learning models 130. Second set of machine-learning models 140 may extract, for example, NER labels, POS labels, relationships, etc., from the extracted text. As such, second set of machine-learning models 140 may provide context to the extracted text.

In operation 808, record keeper 102 tracks the completion status of second set of machine-learning models 140. As indicated above, record keeper 102 may maintain the completion status of second set of machine-learning models 140 in the list. Record keeper 102 may receive a message from a respective machine-learning model of second set of machine-learning models 140 when the respective machine-learning model initiates execution and completes execution.

In operation 810, knowledge manager 104 generates knowledge base 122 using the first set of data objects and the second set of data objects upon the completion of second set of machine-learning models 140. Knowledge manager 104 may generate representations of knowledge manager 104 using first set of data objects and second set of data objects based on the type and location of the data object. The representations may be provided as services to fetch data from knowledge base 122.

Figure 9:
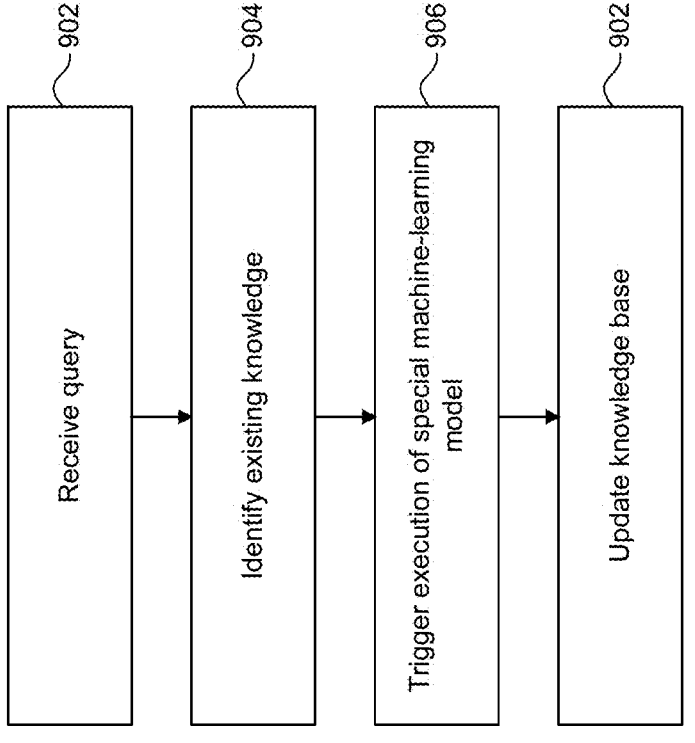
FIG. 9 is a flowchart illustrating the process for querying the knowledge base, according to some embodiments.

FIG. 9 is a flowchart illustrating a process for querying a knowledge base 122 in order to reuse existing knowledge by special machine-learning models 306, according to some embodiments. Method 900 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 9, as will be understood by a person of ordinary skill in the art.

Method 900 shall be described with reference to FIG. 1. However, method 900 is not limited to that example embodiment.

In operation 902, server 100 receives a query to retrieve information from knowledge base 122. Knowledge base 122 may be generated as described above with respect to method 800 in FIG. 8.

In operation 904, knowledge base manager 106 identifies the data in knowledge base 122 relevant to the query. Knowledge base manager 106 may identify the representation of knowledge base 122, which can be used to locate the data based on the query.

In operation 906, knowledge base manager 106 triggers execution of a special machine-learning model (e.g., special machine-learning model 306 as shown in FIG. 3). The special machine-learning model processes the input data pointed to by the knowledge base manager 106 and registered in the record keeper 102 to generate an output.

In operation 908, knowledge manager 104 updates knowledge base 122 using the output from the special machine-learning models.

Figure 10:
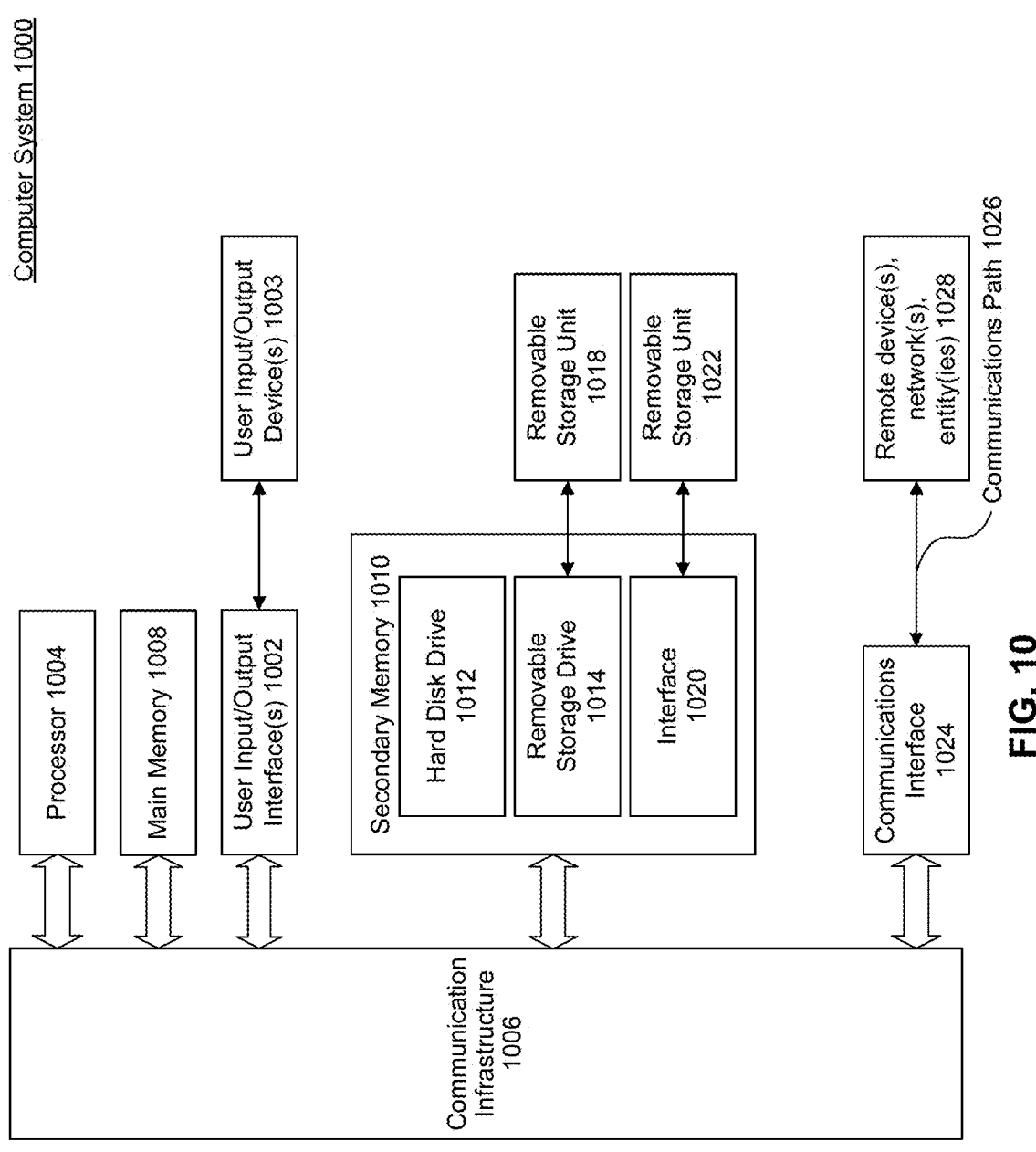
FIG. 10 is a block diagram of example components of a device according to an embodiment.

Various embodiments can be implemented, for example, using one or more computer systems, such as computer system 1000 shown in FIG. 10. Computer system 1000 can be used, for example, to implement methods 800 of FIGS. 8 and 900 of FIG. 9. Furthermore, computer system 1000 can be at least part of server 100, client device 110, and data storage device 120, as shown in FIG. 1. For example, computer system 1000 route communication to various applications. Computer system 1000 can be any computer capable of performing the functions described herein.

Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 can include one or more levels of cache. Main memory 1008 has stored therein control logic (i.e., computer software) and/or data.

Computer system 1000 can also include one or more secondary storage devices or memory 1010. Secondary memory 1010 can include, for example, a hard disk drive 1012 and/or a removable storage device or drive 1014. Removable storage drive 1014 can be a floppy disk drive, a magnetic tape drive, a compact disk drive, an optical storage device, tape backup device, and/or any other storage device/drive.

Removable storage drive 1014 can interact with a removable storage unit 1018. Removable storage unit 1018 includes a computer usable or readable storage device having stored thereon computer software (control logic) and/or data. Removable storage unit 1018 can be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 can include other means, instrumentalities, or other approaches for allowing computer programs and/or other instructions and/or data to be accessed by computer system 1000. Such means, instrumentalities, or other approaches can include, for example, a removable storage unit 1022 and an interface 1020. Examples of the removable storage unit 1022 and the interface 1020 can include a program cartridge and cartridge interface (such as that found in video game devices), a removable memory chip (such as an EPROM or PROM) and associated socket, a memory stick, and USB port, a memory card, and associated memory card slot, and/or any other removable storage unit and associated interface.

Computer system 1000 can further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 can allow computer system 1000 to communicate with remote devices 1028 over communications path 1026, which can be wired and/or wireless, and which can include any combination of LANs, WANs, the Internet, etc. Control logic and/or data can be transmitted to and from computer system 1000 via communication path 1026.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc., using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments but should be defined only in accordance with the following claims and their equivalents.

What is claimed is:

1. A method for generating a knowledge base, the method comprising:

receiving, by a processor, a plurality of files;

triggering, by the processor, execution of a first set of machine-learning models to extract data from the plurality of files, wherein each of the first set of machine-learning models outputs a first set of data objects comprising extracted data from the plurality of files;

triggering, by the processor, execution of a second set of machine-learning models using the first set of data objects, wherein the second set of machine-learning models is configured to output a second set of data objects, each data object in the second set of data objects comprising an attribute of a plurality of attributes, each attribute of the plurality of attributes comprising targeted information extracted from the first set of data objects;

tracking, by the processor, a completion status of each of the second set of machine-learning models;

upon completion of each of the second set of machine-learning models, generating, by the processor, the knowledge base using the first set of data objects and the second set of data objects;

receiving, by the processor, a query;

identifying, by the processor, information in the knowledge base based on the query;

triggering, by the processor, execution of a special machine-learning model to generate an output for the query using the information; and updating, by the processor, the knowledge base using the output.

2. The method of claim 1, wherein the first set of data objects are stored in a data storage device and the method further comprising indicating, by the processor, to the second set of machine-learning models a location of the first set of data objects in the data storage device.

3. The method of claim 1, wherein each of the second set of machine-learning models are configured to identify at least one attribute of the plurality of attributes about the targeted information extracted from the first set of data objects using a machine-learning algorithm.

4. The method of claim 1, wherein the completion status is one of start, in progress, or done.

5. The method of claim 4, wherein triggering the execution of the first or second set of machine-learning models by updating the completion status of the first or second set of machine-learning models to start.

6. The method of claim 4, further comprising:

receiving, by the processor, an indication of that execution of a machine-learning model of the first set of machine-learning models or second set of machine-learning models has been initiated; and updating, by the processor, the completion status of the machine-learning model to in-progress.

7. The method of claim 4, further comprising upon completion of a machine-learning model of the first set of machine-learning models or second set of machine-learning models updating, by the processor, the completion status of the machine-learning model to done.

8. The method of claim 1, further comprising instructing, by the processor, the second set of machine-learning models to execute a subset of machine-learning models of the second set of machine-learning models in parallel.

9. The method of claim 1, wherein execution of a first subset of machine-learning models of the second set of machine-learning models depends on output of a second subset of machine-learning models of the second set of machine-learning models, and the method further comprises instructing, by the processor, the second set of machine-learning models to execute the first and second subset of machine-learning models in a predetermined order.

10. The method of claim 1, wherein the plurality of files comprises structured or unstructured data.

11. The method of claim 1, wherein the attributes of the extracted data comprises one or more of: named entity recognition (NER) label, annotations, or relationships.

12. The method of claim 1, further comprising:

identifying, by the processor, an exception during the execution of a machine-learning model from the second set of machine-learning models; and iteratively triggering, by the processor, re-execution of the second set of machine-learning models until each of the second set of machine-learning models is executed free of any exceptions.

13. The method of claim 1, further comprising:

triggering, by the processor, execution of the second set of machine-learning models to process new extracted data in a new first set of data objects, wherein the second set of machine-learning models is configured to output a new second set of data objects comprising new attributes identified about the new extracted data; and upon completion of each of the second set of machine-learning models, updating, by the processor, the knowledge base using new first set of data objects and the new second set of data objects.

14. The method of claim 1, further comprising:

identifying, by the processor, a done file posted by a first machine-learning model from the first or second set of machine learning models; and identifying, by the processor, a respective completion status of the first machine-learning model from the first or second set of machine learning models based on a file extension of the done file, wherein the file extension indicates that the first machine-learning model processed all, a set, or none of the plurality of files.

15. The method of claim 14, further comprising:

in response to determining that the file extension of the done file indicates that the first machine-learning model processed a set of files of the plurality of files:

instructing, by the processor, a second machine-learning model from the first or second set of machine learning models to process the set of files; and instructing, by the processor, the first machine-learning model to process a remainder of the plurality of files outside the set of files.

16. A system for generating a knowledge base, the system comprising:

a memory; and a processor coupled to the memory, the processor configured to:

receive a plurality of files;

trigger execution of a second set of machine-learning models using the first set of data objects, wherein the second set of machine-learning models are configured to output a second set of data objects and each data object in the second set of data objects comprising an attribute of a plurality of attributes about the extracted data in the first set of data objects;

trigger execution of a second set of machine-learning models to process the extracted data in the first set of data objects, wherein the second set of machine-learning models is configured to output a second set of data objects, each data object in the second set of data objects comprising an attribute of a plurality of attributes, each attribute of the plurality of attributes comprising targeted information extracted from the first set of data objects;

track a completion status of each of the second set of machine-learning models;

upon completion of each of the second set of machine-learning models, generate the knowledge base using the first set of data objects and the second set of data objects;

receive a query;

identify information in the knowledge base based on the query;

trigger execution of a special machine-learning model to generate an output for the query using the information; and update the knowledge base using the output.

17. The system of claim 16, wherein the first set of data objects are stored in a data storage device, and the processor is further configured to indicate a location of the first set of data objects in the data storage device to the second set of machine-learning models.

18. The system of claim 16, wherein each of the second set of machine-learning models are configured to identify at least one attribute of the plurality of attributes about the targeted information extracted from the first set of data objects using a machine-learning algorithm.

19. The system of claim 16, wherein the completion status is one of start, in progress, or done.

20. The system of claim 19, wherein triggering the execution of the first or second set of machine-learning models by updating the completion status of the first or second set of machine-learning models to start.

21. The system of claim 19, wherein the processor is further configured to:

receive an indication of that execution of a machine-learning model of the first set of machine-learning models or second set of machine-learning models has been initiated; and update the completion status of the machine-learning model to in-progress.

22. The system of claim 19, wherein upon completion of a machine-learning model of the first set of machine-learning models or second set of machine-learning models, the processor is further configured to update the completion status of the machine-learning model to done.

23. The system of claim 16, wherein the processor is further configured to instruct the second set of machine-learning models to execute a subset of machine-learning models of the second set of machine-learning models in parallel.

24. The system of claim 16, wherein execution of a first subset of machine-learning models of the second set of machine-learning models depends on output of a second subset of machine-learning models of the second set of machine-learning models, and the processor is further configured to instruct the second set of machine-learning models to execute the first and second subset of machine-learning models in a predetermined order.

25. The system of claim 16, wherein the plurality of files comprises structured or unstructured data.

26. The system of claim 16, wherein the attributes of the extracted data comprises one or more of: named entity recognition (NER) label, annotations, or relationships.

27. The system of claim 16, wherein the processor is further configured to:

identify an exception during the execution of a machine-learning model from the second set of machine-learning models; and iteratively trigger re-execution of the second set of machine-learning models until each of the second set of machine-learning models is executed free of any exceptions.

28. The system of claim 16, wherein the processor is further configured to:

trigger execution of the second set of machine-learning models to process new extracted data in a new first set of data objects, wherein the second set of machine-learning models is configured to output a new second set of data objects comprising new attributes identified about the new extracted data; and upon completion of each of the second set of machine-learning models, update the knowledge base using new first set of data objects and the new second set of data objects.

29. The system of claim 16, wherein the processor is further configured to:

identify a done file posted by a first machine-learning model from the first or second set of machine learning models; and identify a respective completion status of the first machine-learning model from the first or second set of machine learning models based on a file extension of the done file, wherein the file extension indicates that the first machine-learning model processed all, a set, or none of the plurality of files.

30. The system of claim 29, wherein the processor is further configured to:

in response to determining that the file extension of the done file indicates that the first machine-learning model processed a set of files of the plurality of files:

instruct a second machine-learning model from the first or second set of machine learning models to process the set of files; and instruct the first machine-learning model to process a remainder of the plurality of files outside the set of files.

31. A non-transitory computer-readable medium having instructions stored thereon that, when executed by at least one computing device, cause the at least one computing device to perform operations comprising:

receiving a plurality of files;

triggering execution of a first set of machine-learning models to extract data from the plurality of files, wherein each of the first set of machine-learning models outputs a first set of data objects comprising extracted data from the plurality of files;

triggering execution of a second set of machine-learning models using the first set of data objects, wherein the second set of machine-learning models is configured to output a second set of data objects, each data object in the second set of data objects comprising an attribute of a plurality of attributes, each attribute of the plurality of attributes comprising targeted information extracted from the first set of data objects;

tracking a completion of each of the second set of machine-learning models;

upon completion of each of the second set of machine-learning models, generating a knowledge manager to generate the knowledge base using the first set of data objects and the second set of data objects;

receiving a query;

identifying information in the knowledge base based on the query;

triggering execution of a special machine-learning model to generate an output for the query using the information; and updating the knowledge base using the output.

32. The non-transitory computer-readable medium of claim 31, wherein the first set of data objects are stored in a data storage device, and the operations further comprise indicating a location of the first set of data objects in the data storage device to the second set of machine-learning models.

33. The non-transitory computer-readable medium of claim 31, wherein each of the second set of machine-learning models are configured to identify at least one attribute of the plurality of attributes about the targeted information extracted from the first set of data objects using a machine-learning algorithm.

34. The non-transitory computer-readable medium of claim 31, wherein the completion status is one of start, in progress, or done.

35. The non-transitory computer-readable medium of claim 34, wherein triggering the execution of the first or second set of machine-learning models by updating the completion status of the first or second set of machine-learning models to start.

36. The non-transitory computer-readable medium of claim 34, wherein the operations further comprise:

receiving an indication of that execution of a machine-learning model of the first set of machine-learning models or second set of machine-learning models has been initiated; and updating the completion status of the machine-learning model to in-progress.

37. The non-transitory computer readable medium of claim 34, wherein upon completion of a machine-learning model of the first set of machine-learning models or second set of machine-learning models, the operations further comprise updating the completion status of the machine-learning model to done.

38. The non-transitory computer readable medium of claim 31, wherein the operations further comprise instructing the second set of machine-learning models to execute a subset of machine-learning models of the second set of machine-learning models in parallel.

39. The non-transitory computer readable medium of claim 31, wherein execution of a first subset of machine-learning models of the second set of machine-learning models depends on output of a second subset of machine-learning models of the second set of machine-learning models, and the operations further comprise instructing the second set of machine-learning models to execute the first and second subset of machine-learning models in a predetermined order.

40. The non-transitory computer readable medium of claim 31, wherein the plurality of files comprises structured or unstructured data.

41. The non-transitory computer readable medium of claim 31, wherein the attributes of the extracted data comprises one or more of: named entity recognition (NER) label, annotations, or relationships.

42. The non-transitory computer readable medium of claim 31, wherein the operations further comprise:

identifying an exception during the execution of a machine-learning model from the second set of machine-learning models; and iteratively triggering re-execution of the second set of machine-learning models until each of the second set of machine-learning models is executed free of any exceptions.

43. The non-transitory computer readable medium of claim 31, wherein the operations further comprise:

triggering execution of the second set of machine-learning models to process new extracted data in a new first set of data objects, wherein the second set of machine-learning models is configured to output a new second set of data objects comprising new attributes identified about the new extracted data; and upon completion of each of the second set of machine-learning models, updating the knowledge base using new first set of data objects and the new second set of data objects.

44. The non-transitory computer readable medium of claim 31, wherein the operations further comprise:

identifying a done file posted by a first machine-learning model from the first or second set of machine learning models; and identifying a respective completion status of the first machine-learning model from the first or second set of machine learning models based on a file extension of the done file, wherein the file extension indicates that the first machine-learning model processed all, a set, or none of the plurality of files.

45. The non-transitory computer readable medium of claim 31, wherein the operations further comprise:

in response to determining that the file extension of the done file indicates that the first machine-learning model processed a set of files of the plurality of files:

instructing a second machine-learning model from the first or second set of machine learning models to process the set of files; and instructing the first machine-learning model to process a remainder of the plurality of files outside the set of files.

\* \* \* \* \*